Oct. 10, 1950 S. MOREL 2,525,559
FILTER
Filed Oct. 21, 1946
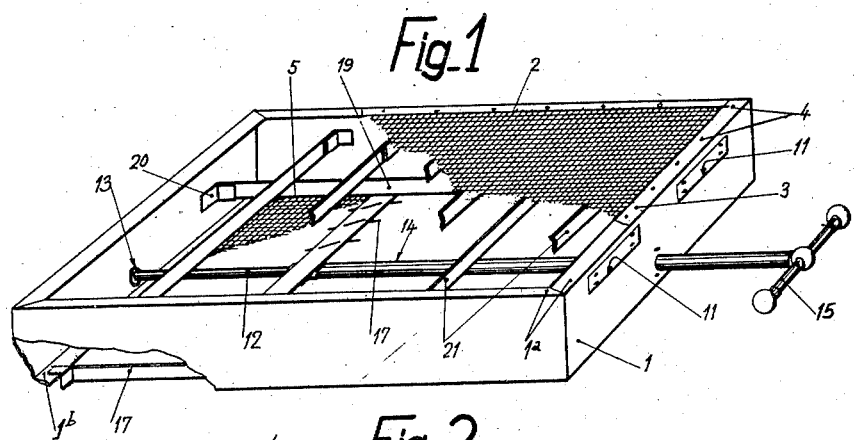
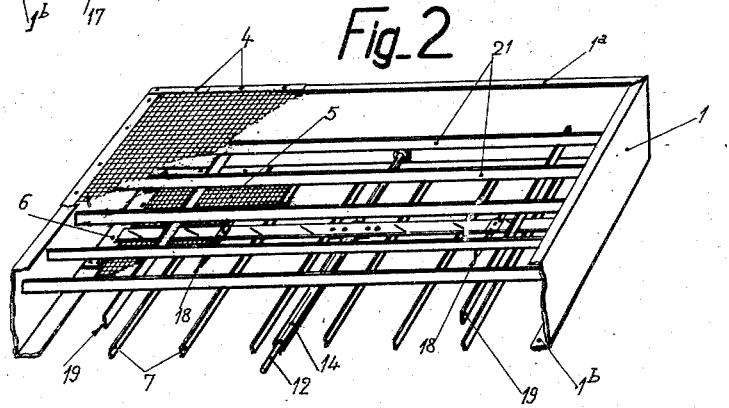
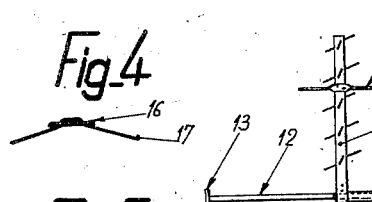
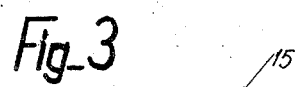
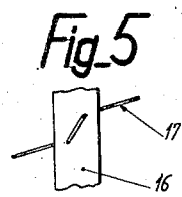
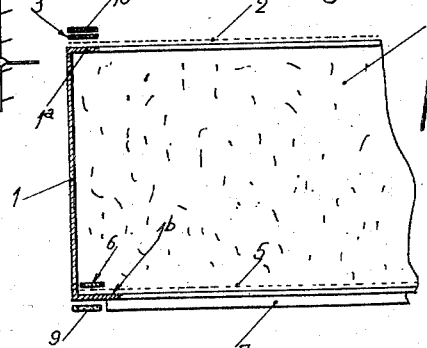
STANISLAS MOREL
INVENTOR
his ATTY.

Patented Oct. 10, 1950

2,525,559

UNITED STATES PATENT OFFICE 2,525,559

FILTER

Stanislas Morel, Paris, France

Application October 21, 1946, Serial No. 704,673
In France October 30, 1945

3 Claims. (Cl. 183—45)

This invention relates to filters for separating dust and solid matter from air or fluids generally.

It is well known that frames filled with granules of coke or cork are utilized to filter air or other gases for the purpose of separating dust and foreign matter either because of their value or because of their noxiousness.

Such frames comprise two pervious faces permitting of passage therethrough for the flow of air or gases to be filtered. The granules form an accumulation of obstructions within the frame forcing the flow of air or other gas to diverge repeatedly, thereby undergoing numerous changes of direction and facilitating the deposit of the particles. As a result the filtering material becomes gradually clogged by said particles and it is necessary to clean it.

Said cleaning can only be effected by shaking or beating the frame, but such methods do not permit of a thorough cleaning throughout the entire thickness of the filtering material and will cause the latter to settle and thus lose its filtering power.

The object of the invention is to provide means for facilitating the cleansing or renewing of the filtering material when it becomes clogged or useless.

The principal feature of the apparatus lies in that it includes means for cleaning the filtering material. These means consist preferably of at least one means for agitating the filtering material within the frame by means extending outside said frame, so as to free the filtering material from the collected foreign matter.

According to a preferred embodiment of the invention the agitating means comprises a poker or pokers consisting of an operating rod or tube carrying a cross-bar provided with resilient spikes, the whole forming kind of harrow.

Further features of the invention will become apparent from the following description with reference to the accompanying drawing, which shows, by way of example one illustrative embodiment of the invention, and in which:

Fig. 1 is a perspective view of the filter partly broken away;

Fig. 2 is another perspective view;

Fig. 3 is a plan view of the harrow-shaped agitator;

Fig. 4 is a transverse section of same on enlarged scale;

Fig. 5 is a corresponding plan view;

Fig. 6 is a vertical transverse section of the filter frame, partly broken away.

Referring to the illustrated embodiment, the filter assumes the form of a rectangular parallelepipedic structure consisting of a metallic frame 1 formed of four channel irons which comprise the walls thereof, the upper legs $1^a$ of which are preferably of less length than the lower legs $1^b$. Screens 2 and 5 are secured to the upper and lower legs of the channels, respectively, and are secured in position by means of clamping frames 3 and 6, respectively, riveted to said frame 1.

The side walls of said frame are joined by bars 7 secured beneath the lower legs $1^b$ of the frame 1 below the screen 5 so as to support said screen 5 under the weight of the filtering particles 8, said particles consisting of cork or like filtering material having irregular absorbent surfaces as extensive as possible.

Fig. 6 shows felt strips 9 and 10 extending beneath and above the frame 1 and adapted to be inserted between the frame and its support (not shown).

In one of its end walls and near its upper edge the frame 1 (Fig. 1) is provided with one or more charging apertures 11. A longitudinal rod 12 extends lengthwise through the frame close to the lower screen 5 and is secured at one of its ends by means of a flange 13 to one of the end walls of the frame.

A tube 14 is slidably mounted on the rod 12 and projects outside the filter frame through the end wall opposite that to which the rod 12 is secured. Said tube 14 terminates in a handle or any operating member 15. At the end of the tube 14 located within the filter is secured a transverse horizontal crossbar 16 carrying short lengths of metal wire or spikes 17.

The attachment thereof, as shown in Figures 3, 4 and 5 is ensured in the manner of clasps formed with the two ends of the wires inserted through two holes provided in the crossbar 16, and projecting transversely of the crossbar in opposite directions so as to assume oblique positions with respect to the horizontal plane and the longitudinal axis of said crossbar.

Adjacent its ends the crossbar 16 carries two transversely extending flat iron stop members 18 secured thereto by riveting or otherwise and partially twisted edgewise into a vertical longitudinal plane. These stop members are of a length greater than that of the spikes 17 so that during reciprocation of said crossbar, the ends of the stop members 18 will engage the end walls of the filter frame, thereby preventing damage to the spikes.

Slightly above the crossbar 16 are arranged two lateral guides each being formed of a bar 19 of flat material disposed on its edge and secured by means of angle irons 20 (Fig. 1) or directly by welding (Fig. 2) to the end walls of the frame 1.

The said guiding bars are spaced from the screen and guide the crossbar 16 to prevent the latter from coming into contact with the screen 5 and prevent accidental contact of the wires 17 with the screen.

Upper bars 21 connect the side walls of the frame adjacent the screen 2.

Of course, the filter will be utilized in the usual way, whereby it is placed in the path of flow of the air or other gas to be filtered.

The fluid enters through the screen 2 or 5 and passes out through the screen 5 or 2 leaving the dust particles on the cork granules or like material. When the filtering material has become clogged, i. e. when the spaces between the cork granules are filled up with dust and their own surfaces coated therewith a cleaning operation is rapidly effected by rocking the harrow-shaped agitator by reciprocating the handle 15, the tube 14 sliding on the guiding rod 12, the crossbar and spikes effecting a thorough mixing or agitating of the filtering granules 8 which are very quickly freed from the dust particles which thereupon pass through the lower screen 5.

The reciprocating motion of the agitator causes the whole filtering material located above it to be subjected to an alternate undulating movement in both directions. Throughout said motion the granules are displaced and turned around thus promoting the separation of the dust particles. Said particles traverse the filtering medium by gravity and collect below the frame.

The shocks of the ends of the flat iron stop members 18 against the end walls of the frame 1 occurring during reciprocation cause further agitation of the filtering material.

The bars 21 oppose undue horizontal displacement of the filtering material caused by the reciprocation of the agitator.

The charging door or doors 11 permit of supplying the frame with filtering granules to replace the ones that are worn out and have fallen through the screen 5 in the course of successive cleaning processes.

It will be noted that the frame should not be tightly packed with filtering material in order to permit of ready operation of the agitator and allow for the movement of the granules during cleaning process.

The agitator may be fitted with handles operated manually or combined with any automatic or non-automatic device with direct or remote control (not shown).

Having now described my invention, what I claim as new and desire to secure by Letters Patent is:

1. A filtering apparatus for gaseous fluids, which comprises a frame forming a casing having open faces on its opposite sides, a screen extending across each face and secured to said frame; a filling of dry and light filtering granules of cork within said casing; an agitator within said casing to agitate and mix said granules, said agitator comprising a longitudinally reciprocable bar extending through said frame, a crossbar on said bar extending transversely thereof within the casing, flexible spikes secured on said crossbar transversely thereof, extending substantially horizontally therefrom and at an oblique angle with respect thereto, a stop member at each end of said crossbar extending transversely thereof, said stop members being of a length greater than that of said spikes so as to engage the walls of the casing during reciprocation of said bar and prevent damage to said spikes, means within the casing for guiding said agitator and maintaining it in spaced relation to said screens and means outside of the casing for actuating said reciprocable bar.

2. A filtering apparatus according to claim 1 in which said crossbar is perforated along its length and said spikes comprise wires inserted into said perforations.

3. A filtering apparatus according to claim 1, wherein a longitudinal, horizontally extending guiding rod is secured to one end of said frame within the casing, said agitator including a tube which encases said rod and slides over it during reciprocation, said guiding means comprising bars extending longitudinally of said frame and secured thereto to support said crossbar in its reciprocal movements.

STANISLAS MOREL.

REFERENCES CITED

The following references are of record in the file of this patent:

UNITED STATES PATENTS

| Number | Name | Date |
|---|---|---|
| 426,092 | Andrews | Apr. 22, 1890 |
| 1,373,280 | Wells | Apr. 29, 1921 |
| 1,483,379 | Reed | Feb. 12, 1924 |

FOREIGN PATENTS

| Number | Country | Date |
|---|---|---|
| 477,365 | France | Oct. 15, 1915 |